Aug. 28, 1923. 1,466,453
K. R. MANVILLE
CONTROL DEVICE FOR GEAR SHIFTING MECHANISM
Filed March 13, 1920
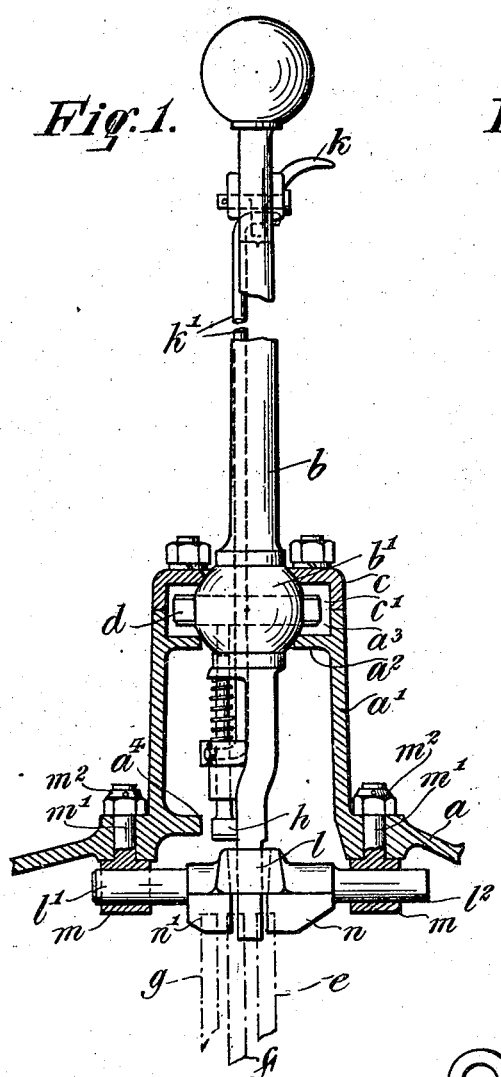
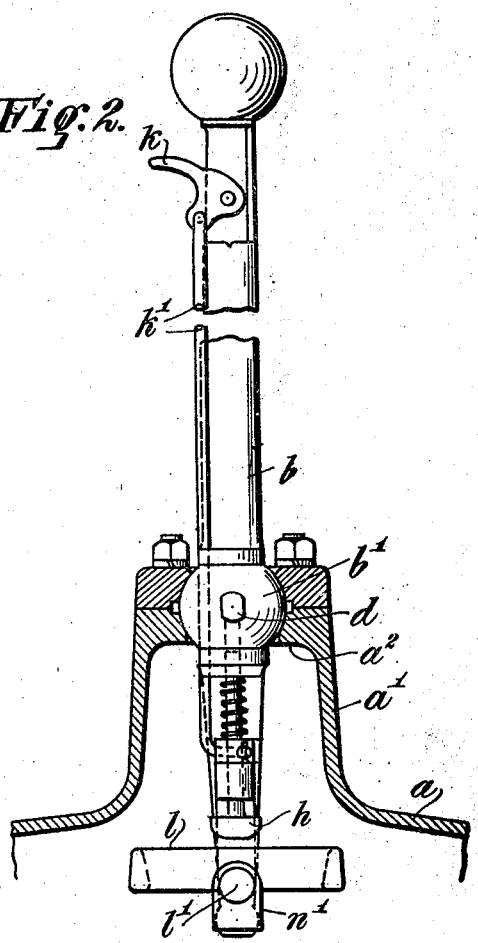
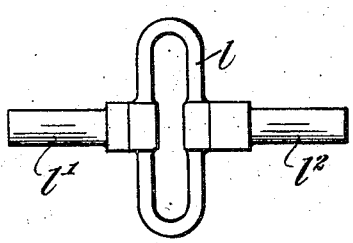
INVENTOR
Keith R. Manville
BY
Redding & Meeley
ATTORNEYS Patented Aug. 28, 1923.

1,466,453

UNITED STATES PATENT OFFICE.

KEITH R. MANVILLE, OF HEMPSTEAD, NEW YORK, ASSIGNOR TO INTERNATIONAL MOTOR COMPANY, OF NEW YORK, N. Y., A CORPORATION OF DELAWARE.

CONTROL DEVICE FOR GEAR-SHIFTING MECHANISM.

Application filed March 13, 1920. Serial No. 365,420.

*To all whom it may concern:*

Be it known that I, KEITH R. MANVILLE, a citizen of the United States, residing at Hempstead, Long Island, in the State of New York, have invented certain new and useful Improvements in Control Devices for Gear-Shifting Mechanism, of which the following is a specification, reference being had to the accompanying drawing, forming a part hereof.

This invention relates to a simple and inexpensive control mechanism for gear shifts designed primarily with reference to its use in connection with the shifting mechanism for motor cars having four speeds and reverse. In such devices it is important that they shall satisfy manufacturing considerations of casting, machining and assembling and shall satisfy the operator's requirements of facility of control. In addition, such devices must serve to lock the shifter forks against simultaneous movement so as to prevent positively the accidental engagement of more than one set of gears at a time. The present improvements accomplish all the objects discussed above. Reference is to be had to the accompanying drawing for a detailed description of one embodiment, in which—

Figure 1 is a view in section of a fragment of the cover of a transmission case, showing the application of the improved devices thereto.

Figure 2 is a view similar to Figure 1, but taken on a plane at right angles thereto.

Figure 3 is a detail view in plan of the locking device for the gears.

The cover plate $a$ of the transmission case may carry thereon, preferably integral therewith, a "tower" $a'$ for the support of the shifter lever $b$. This tower may have cast within it adjacent the top a web $a^2$ provided with a central aperture through which extends the lever $b$, a spherical enlargement $b'$ of the lever resting on the web $a^2$. A cover plate $c$ for the tower $a'$ is bolted thereto and has a central opening therein which is of just sufficient size to receive the spherical enlargement $b'$ on the lever $b$. Within the tower $a'$ and its cover $c$ are formed at diametrically opposed points, registering grooves $a^3$, $c'$, respectively, to receive the ends of a pin $d$ which extends through the enlarged spherical portion $b'$ of the lever $b$. The protruding ends of the pin $d$ constitute guide ears of irregular cross sectional form resting within the grooves $a^3$, $c'$ to permit rocking of the lever on its seat $a^2$ in a transverse vertical plane. The portion of the pin $d$ within the spherical enlargement $b'$ of the lever $b$ is cylindrical so that the lever $b$ can be moved pivotally about the pin in a plane at right angles to the first mentioned plane of movement.

Within the transmission case are mounted the usual shiftable gears and associated shifting mechanism, it being necessary for an understanding of the present invention to indicate conventionally in the drawing only fragments of shifter forks $e$, $f$, $g$, one of which forks, $g$, may be considered, for instance, the fork controlling the movement of the reverse idler, while the other two forks $e$, $f$ may be considered the forks to control selectively the engagement of the gears giving the four forward speeds. The lower end of the shifted lever $b$ may obviously be moved into engagement with either one of the shifter forks $e$, $f$ by rocking the lever transversely. It is held against movement into engagement with the reverse fork $g$ by means of a spring-pressed plunger $h$ carried with the lever and adapted to engage a flanged abutment $a^4$, preferably cast within the tower $a'$. The engagement of this plunger $h$ with the flanged abutment $a^4$ limits the rocking movement of the lower end of the lever $b$ so that it cannot be engaged with the reverse shifter fork $g$ until the plunger is drawn out of the path of the abutment. Such withdrawal can be effected conveniently by the operator by means of a finger pull lever $k$ adjacent the upper end of the shifter lever $b$, this finger pull being connected operatively with the plunger $h$ by means of a pull rod $k'$ extending downwardly alongside of the lever $b$.

The shifter forks $e$ and $f$ are held against accidental simultaneous operation by means of the locking device shown in Figure 3. This locking device comprises generally a yoke section $l$ in which rests the lower end of the shifter lever $b$. Integral with this yoke section are two oppositely extending supporting and guiding trunnions $l'$, $l^2$ which rest in lugs $m$ secured within the cover plate $a$ of the transmission housing by means of bolts $m'$ which may be formed integral with the lugs, and nuts $m^2$, which may be threaded on to the ends of the bolts. On the lower side of the yoke section $l$ and generally in line with the trunnions $l'$, $l^2$ are formed locking flanges $n$, $n'$ which rest within the usual slots in the shifter forks $e$, $f$, $g$, according to the lateral position of the yoke $l$ with relation to said forks. For instance, in the position shown in Figure 1, the forks $f$, $g$ are engaged by the locking flange $n'$ while the fork $e$ is engaged by the locking flange $n$. At this time the lever $b$ is not engaging either of the forks. When the lever is moved laterally, the lower end thereof will slide the yoke section $l$ through its trunnions $l'$, $l^2$ until the lower end of the lever engages one or the other of the shifter forks $e$, $f$, $g$. Meanwhile the locking flange for that particular fork will have been carried out of the slot therein, while the locking flange for each other fork will remain in engagement therewith. Swinging movement of the lever in a transverse plane to its initial lateral movement will then effect the shifting of the gears selected, the lower end of the lever moving lengthwise of the yoke section $l$ of the locking device. With any one of the gears engaged, it will manifestly be impossible to rock the lever $b$ or move the yoke section $l$ laterally until the lever is returned to its median position when its lower end is in alinement with the slots of all of the shifter forks $e$, $f$, $g$.

The device described and illustrated is simple and effective in operation. The various shifter forks are locked against accidental operation while they are picked up selectively through simple mechanical operations. The reverse shifter fork cannot be picked up without an unusual movement by the operator of a character different from any of his movements during the changing of the forward speeds. This is a desirable characteristic in such a control device.

The scope of the invention will appear from the appended claims.

I claim as my invention:

1. In a gear casing in combination with gear shifting forks, of gear shifting mechanism, control devices comprising a yoke member, a shifting lever engaging the yoke, alined trunnions carried by the yoke, lugs to support the trunnions for axial movement thereof with the yoke, bolts carried with the lugs and extending through the gear casing, nuts to lock the bolts in place, and locking flanges for the forks carried with the yoke and movable therewith to lock one of the shifter forks and unlock another shifter fork when the lever is engaged operatively with the last named fork.

2. In combination with shifter forks, of gear shifting mechanism for forward speeds and reverse, control devices comprising a yoke member, a shifter lever engaging the yoke, alined trunnions carried by the yoke, means to support the trunnions for axial movement thereof with the yoke, locking flanges for the forks carried with the yoke and movable therewith to lock one of the forks and unlock another fork when the lever is engaged operatively with the last named fork, an abutment carried with the gear casing, a plunger extending longitudinally and exteriorly of the lever and cooperating with the flanged abutment to hold the lever against engagement with the reverse speed fork, and a finger pull operatively engaged with the plunger to retract it from engagement with the abutment.

This specification signed this 11th day of March, A. D. 1920.

KEITH R. MANVILLE.